(12) United States Patent  
Shafer et al.

(10) Patent No.: US 8,793,114 B2  
(45) Date of Patent: Jul. 29, 2014

(54) METHOD AND SYSTEM FOR DRILLING RIG TESTING USING VIRTUALIZED COMPONENTS

(75) Inventors: Donald F. Shafer, Marfa, TX (US); Mark Price, Austin, TX (US); William T. O'Grady, Jr., Austin, TX (US); Nestor Fesas, Lakeway, TX (US)

(73) Assignee: Athens Group Holdings LLC, Austin, TX (US)

( * ) Notice: Subject to any disclaimer, the term of this patent is extended or adjusted under 35 U.S.C. 154(b) by 282 days.

(21) Appl. No.: 13/278,903

(22) Filed: Oct. 21, 2011

(65) Prior Publication Data

US 2012/0173218 A1 Jul. 5, 2012

Related U.S. Application Data

(60) Provisional application No. 61/428,165, filed on Dec. 29, 2010.

(51) Int. Cl.
| | |
|---|---|
| *G06G 7/48* | (2006.01) |
| *G05B 15/02* | (2006.01) |
| *G05B 23/02* | (2006.01) |
| *E21B 44/00* | (2006.01) |
| *E21B 41/00* | (2006.01) |
| *E21B 21/08* | (2006.01) |
| *E21B 47/12* | (2012.01) |
| *E21B 10/62* | (2006.01) |

(52) U.S. Cl.
CPC ............. *E21B 44/00* (2013.01); *E21B 21/08* (2013.01); *G05B 15/02* (2013.01); *G05B 23/0256* (2013.01); *E21B 47/12* (2013.01); *E21B 41/00* (2013.01); *E21B 10/62* (2013.01)
USPC ............................................. 703/10

(58) Field of Classification Search
None
See application file for complete search history.

(56) References Cited

U.S. PATENT DOCUMENTS

| | | | |
|---|---|---|---|
| 5,787,002 | A | 7/1998 | Iwamoto et al. |
| 6,732,804 | B2 | 5/2004 | Hosie et al. |
| 6,766,869 | B2 | 7/2004 | Brand et al. |

(Continued)

FOREIGN PATENT DOCUMENTS

| | | |
|---|---|---|
| WO | 2008127125 A2 | 10/2008 |
| WO | 2009113867 A1 | 9/2009 |

OTHER PUBLICATIONS

Bjohn Tveter Towards Autonomous Control of Drilling Rigs University of Oslo, Master thesis, Department of Informatics, May 22, 2009.*

(Continued)

*Primary Examiner* — Omar Fernandez Rivas  
*Assistant Examiner* — Cuong Luu  
(74) *Attorney, Agent, or Firm* — Jackson Walker L.L.P.

(57) ABSTRACT

A method and system dynamically generates virtualized configurations of sensors and signals used in drilling system equipment. The virtualized configurations may be used for novel operational testing of automation systems on drilling rigs. The methods and systems may be configured to virtualize actual drill floor equipment in order to have enhanced fault coverage of the automation systems. A control network that is a component of the automation systems may implement a testing loop that accommodates virtualized equipment in a manner substantially similar to actual equipment. In this manner, the testing loop may be configured to control elements specific to the equipment under control, and generate testing results for those specific control elements.

19 Claims, 9 Drawing Sheets

(56) References Cited

U.S. PATENT DOCUMENTS

| | | |
|---|---|---|
| 6,820,702 B2 | 11/2004 | Niedermayr et al. |
| 7,172,037 B2 | 2/2007 | Dashevskiy et al. |
| 7,177,734 B2 | 2/2007 | Fossen et al. |
| 7,397,363 B2 | 7/2008 | Joao |
| 7,574,325 B2 | 8/2009 | Dykstra |
| 7,702,435 B2 | 4/2010 | Pereira et al. |
| 2005/0222772 A1 | 10/2005 | Koederitz et al. |
| 2006/0058929 A1 | 3/2006 | Fossen et al. |
| 2007/0021857 A1* | 1/2007 | Huang .................. 700/117 |
| 2007/0100478 A1 | 5/2007 | Egeland et al. |
| 2009/0088884 A1 | 4/2009 | Yuan et al. |
| 2009/0132458 A1* | 5/2009 | Edwards et al. ............ 706/50 |
| 2009/0225630 A1 | 9/2009 | Zheng et al. |
| 2010/0181075 A1 | 7/2010 | Reynolds |
| 2010/0193245 A1 | 8/2010 | Glomsrud et al. |
| 2011/0220410 A1 | 9/2011 | Aldred et al. |
| 2011/0280104 A1* | 11/2011 | McClung, III .................. 367/82 |
| 2011/0313812 A1* | 12/2011 | Duvvoori et al. ............ 705/7.27 |

OTHER PUBLICATIONS

International Search Report and Written Opinion of the International Searching Authority, International Patent Application No. PCT/US2011/067818, mailed Nov. 6, 2012, 11 pages.

Rommetveit, et al., eDrilling: A System for Real-Time Drilling Simulation, 3D Visualization, and Control, SPE Papers, vol. SPE 106903, Apr. 11, 2007, 6 pages.

\* cited by examiner

EXEMPLARY STATE MODEL OF A DRILLING
RIG CONTROL SYSTEM

METHOD AND SYSTEM FOR DRILLING RIG TESTING USING VIRTUALIZED COMPONENTS

This application claims the benefit of provisional patent application Ser. No. 61/428,165, filed Dec. 29, 2010, which is incorporated herein by reference.

BACKGROUND

1. Field of the Disclosure

The present disclosure relates to drilling rig testing with virtualized components and, more particularly, to drilling system modeling and fault prediction using virtualization of equipment in a drilling rig control network.

2. Description of the Related Art

On modern oil and gas well drilling rigs, automation systems have been developed to enhance safety, for example, by removing as many people as possible from the drill floor. The automation systems result in additional components and interfaces that are potential sources of failure. During operational testing of the drilling rig, testing and verification of the automation systems, therefore, represents an important aspect for obtaining a high level of reliability and safety. Since the automation systems may effectively be in control of most of the mechanical and electronic equipment, conventional testing of drilling rig automation systems may be constrained by the ability to physically implement a large number of desired operational scenarios.

DETAILED DESCRIPTION OF THE EMBODIMENT(S)

Disclosed herein is a method and system for dynamically generating virtualized configurations of sensors and signals used in drilling system equipment. The virtualized configurations may be used for novel operational testing of automation systems on drilling rigs. The methods and systems described herein may be configured to virtualize actual drill floor equipment in order to have enhanced fault coverage of the automation systems. A control network that is a component of the automation systems may implement a testing loop that accommodates virtualized equipment in a manner substantially similar to actual equipment. In this manner, the testing loop may be configured to control elements specific to the equipment under control, and generate testing results for those specific control elements, as will be described in further detail herein.

Based on extensive industry experience, it has been better understood that the drilling rig physical equipment may often function correctly mechanically, hydraulically and even electrically. However, certain sensors, signals, programmable logic controllers (PLCs) and software, which represent individual elements in the control network, may exhibit errors that are hard to detect and difficult to distinguish from physical equipment failures. Even when a zone management system is present to prevent fault conditions between various pieces of equipment, certain unforeseen fault states may still be attainable by the drilling rig control network, which may represent an undesired source of operational and safety risk on the drilling rig.

In order to effectively test the control network, more extensive testing may be accomplished by virtualizing mechanical components of the drilling rig, which may allow for greater scrutiny of sensors, signals and control software by enabling the implementation of a greater number of operational scenarios during testing. A number of advantages may be realized through virtualizing the mechanical components of the drilling rig during testing. Since the virtualized equipment is not physically manipulated, operational costs of testing may be reduced, while potential damage to actual equipment as a result of testing errors or desired fault scenarios may be prevented.

It is noted that the systems and methods described herein may be used for testing automation systems on drilling rigs with or without virtualization of drilling rig equipment. In various embodiments, actual drilling rig equipment may be used for a range of testing scenarios, without relying on virtualization of components. In other instances, combinations of virtualized equipment and actual equipment may be implemented using the drilling rig testing systems described herein.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Figure 1:
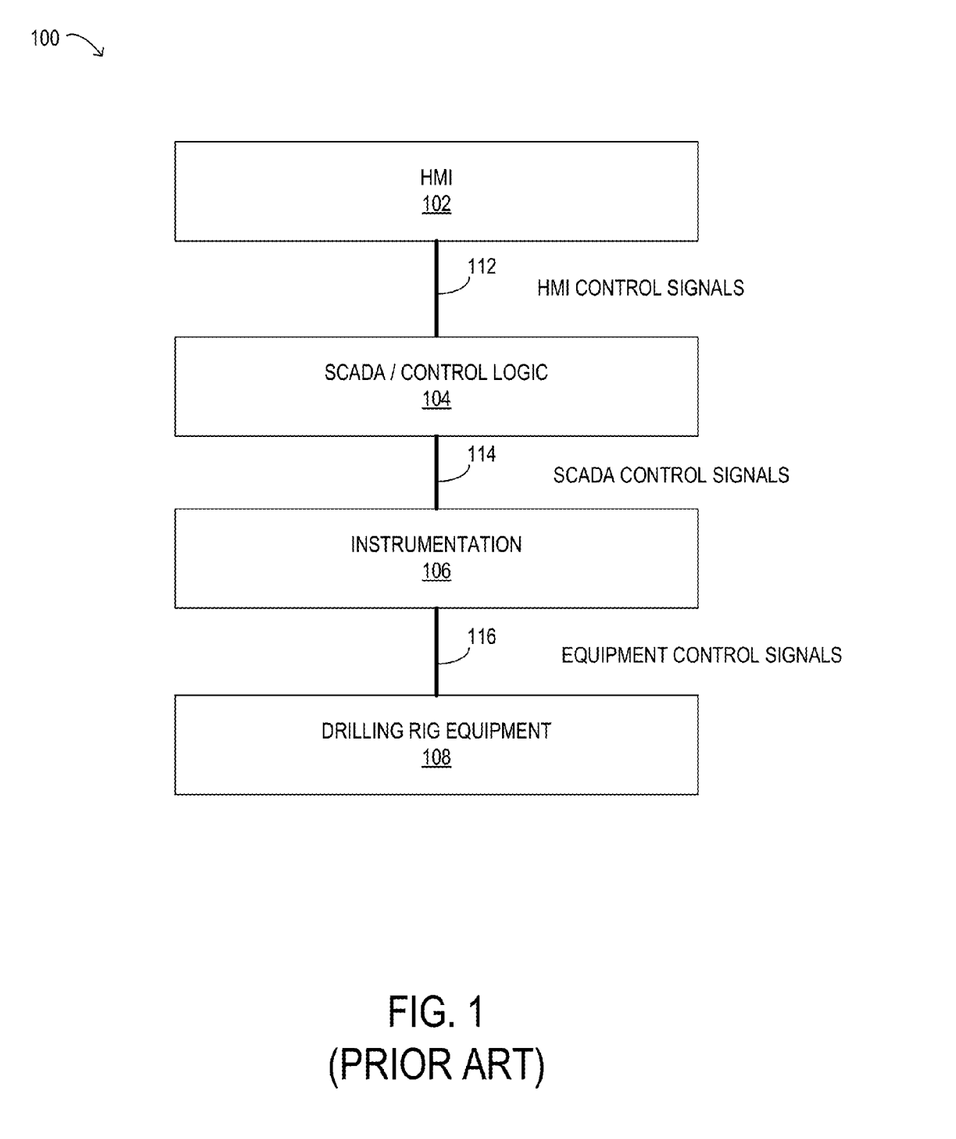
FIG. 1 is a block diagram of selected elements of an embodiment of a prior art drilling rig system.

Turning now to the figures, FIG. 1 shows selected elements of prior art drilling rig system 100 are depicted in block diagram form. Prior art drilling rig system 100 is shown including drilling rig equipment 108, representing the physical drilling components and infrastructure. Instrumentation 106 represents sensors, power supplies, signal conditioning and related electronics, along with their associated interfaces and connections, as well as executable code (i.e., software). Instrumentation 106 may communicate with drilling rig equipment 108 via equipment control signals 116. Also shown in prior art drilling rig system 100 is supervisory control and data acquisition (SCADA)/control logic 104, which may represent PLCs, computer systems, networks, storage systems, etc. SCADA/control logic 104 may represent intelligent control of instrumentation 106 and drilling rig equipment 108, and may communicate with instrumentation 106 via SCADA control signals 114. Human machine interface (HMI) 102 may represent a top layer of prior art drilling rig system 100 that provides for operator command and control through HMI control signals 112 that may communicate with SCADA/control logic 104.

As noted previously, during an initial operational testing of prior art drilling rig system 100, many sources of faults may be present in SCADA/control logic 104, SCADA control signals 114, instrumentation 106, and equipment control signals 116. However, since drilling rig equipment 108 is physically installed, the number of test scenarios that are available may be limited and may constrain an ability of a test system to detect fault sources. For example, certain operational scenarios that may uncover new fault states may only be attainable through actual manipulation and operation of physical equipment (rather than through simulation), risking damage to both the physical equipment and the safety of personnel. Since the remediation costs for equipment damage are often economically prohibitive, operational testing of prior art drilling rig system 100 is often restricted to relatively 'safe' and, therefore, routine types of potential faults, errors, and alarms, which may not be predictive of actual operational conditions or certain catastrophic failures. Therefore, thorough and effective operational testing (i.e., testing that provides a high degree of confidence in operational integrity for a wide range of operational states) of prior art drilling rig system 100 may be prohibitively expensive or impossible, due to risks and costs associated with actually attaining a number of highly relevant and possible fault scenarios to determine their effects on various pieces of equipment and the system as a whole. As a result, prior art drilling rig system 100 may typically be operated in a condition that still includes very real risks of equipment damage and personnel injury.

Figure 2:
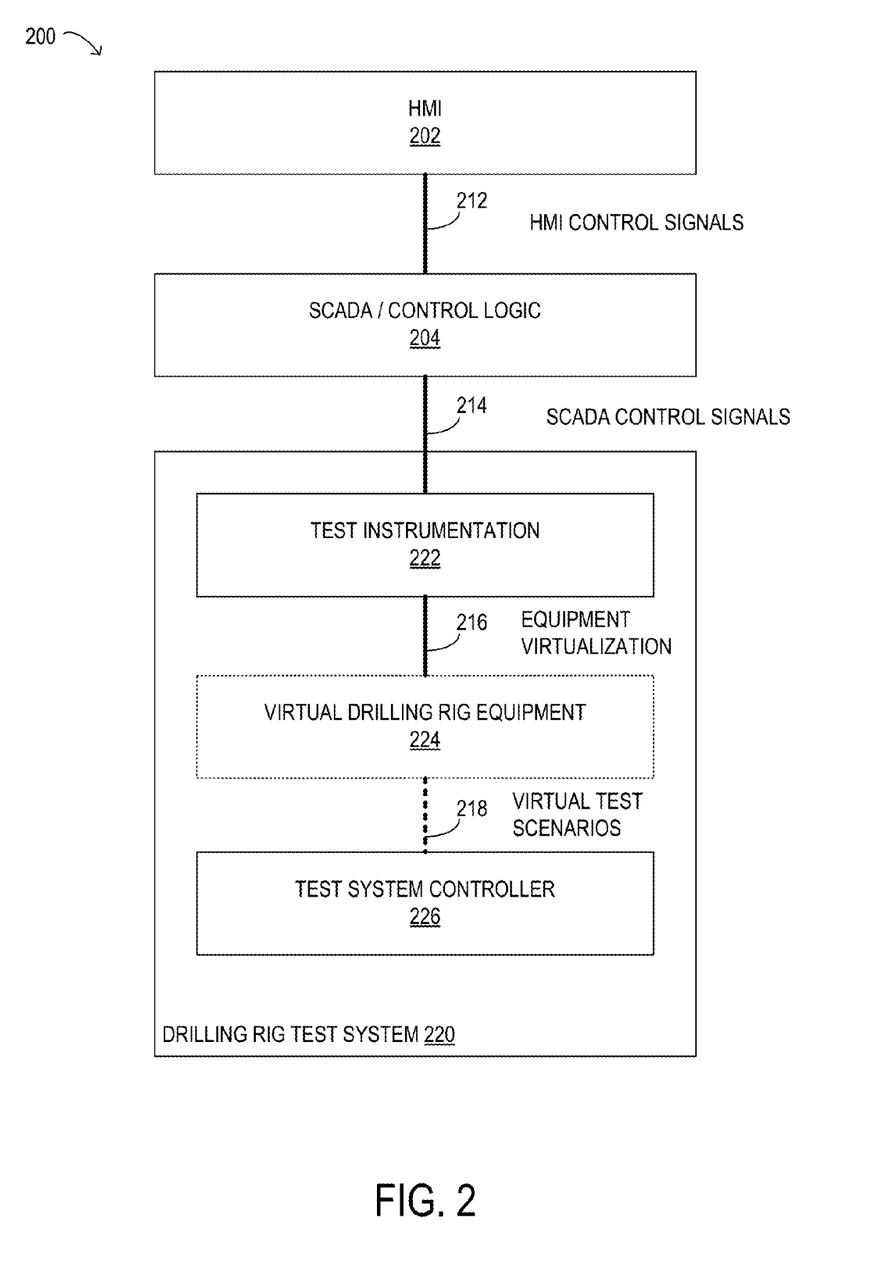
FIG. 2 is a block diagram of selected elements of an embodiment of a drilling rig test system architecture.

Referring now to FIG. 2, selected elements of an embodiment of drilling rig system 200, incorporating drilling rig test system 220, according to the methods described herein, are presented in block diagram form. Drilling rig test system 220 may represent a novel embodiment configured to use virtualized equipment, as will be described in detail herein. As shown in FIG. 2, drilling rig system 200 may include HMI 202, which communicates via HMI control signals 212 with SCADA/control logic 204. SCADA/control logic 204 may, in turn, communicate with drilling rig test system 220 via SCADA control signals 214.

In FIG. 2, drilling rig test system 220 may include test instrumentation 222, which may serve to interface to physical equipment via SCADA control signals 214 and provide signals for equipment virtualization 216, as desired. Virtual drilling rig equipment 224 and virtual test scenarios 218 may represent virtualized components that behave similar to actual components from the perspective of SCADA/control logic 204. In this manner, test system controller 226 may be used to execute a wide range of test scenarios for operational testing of drilling rig system 200.

In operation, test system controller 226 may generate virtual test scenarios 218, that may include virtual and/or actual equipment. Virtual test scenarios 218 may incorporate a model based on a particular design of the drilling rig. The model may be implemented with model objects representing drilling rig equipment, both real and virtual (see also FIGS. 4, 6). Virtual test scenarios 218 may represent a series of automatic or manual test operations that are implemented within a context of a state model for the drilling rig (see also FIG. 7), which provides the ability to simulate both real and virtual components of the drilling rig in various operational scenarios. Then, SCADA/control logic 204 and HMI 202 may be used to perform operational tasks, such as executing standard startup or other procedures. Test system controller 226 may generate alarms that are registered by HMI 202. It is also noted that test results may be recorded to protocol testing procedures and for debugging or failure source analysis.

Figure 3:
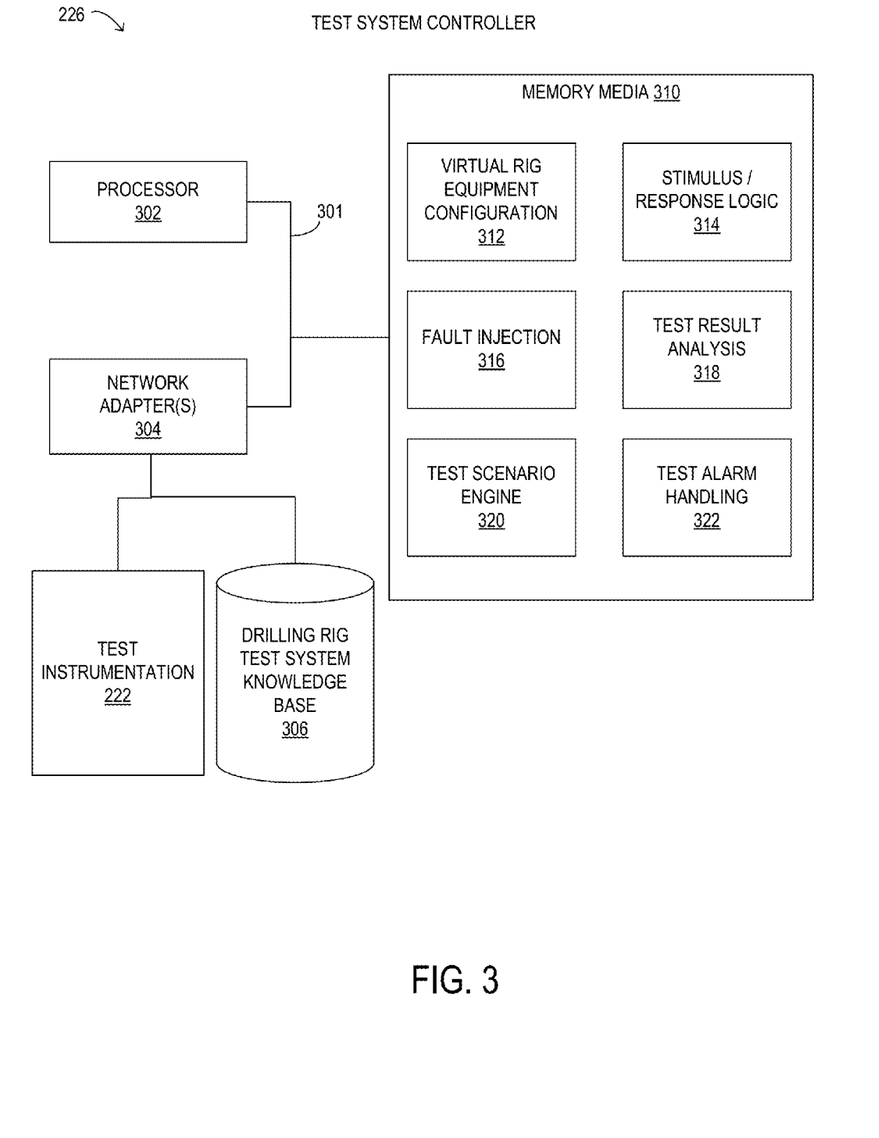
FIG. 3 is a block diagram of selected elements of an embodiment of a drilling rig test system controller.

Referring now to FIG. 3, selected elements of an embodiment of test system controller 226, according to the methods described herein, are presented in block diagram form. Test system controller 226 may represent a novel computing platform configured to implement simulation and virtualization of operational drilling rig testing, as described in detail herein.

In the embodiment depicted in FIG. 3, test system controller 226 includes processor 302 coupled via shared bus 301 to storage media collectively identified as memory media 310. Test system controller 226, as depicted in FIG. 3, further includes network adapter 304 that may interface test system controller 226 to a network (not shown in FIG. 3, see FIG. 5). In embodiments suitable for use with the methods and systems described herein, test system controller 226, as depicted in FIG. 3, may be coupled via network adapter 304 to test instrumentation 222 (see FIG. 2) and drilling rig test system knowledge base 306. Machine readable knowledge bases, such as drilling rig test system knowledge base 306, store knowledge in a computer readable form for the purpose of automated deductive reasoning. The computer readable form may be a set of rules that describe the knowledge in a logically consistent manner. An ontology may define the structure of stored data, including types of entities recorded and relationships between entities. Logical operators, such as 'and' (conjunction), 'or' (disjunction), material implication and negation, among other examples, may be used to build knowledge from simpler pieces of information. Accordingly, classical deduction may also be used to reason about the knowledge in the knowledge base.

Although not explicitly shown in FIG. 3, test system controller 226 may also include a peripheral adapter, which provides connectivity for the use of input devices and output devices. Input devices may include a device for user input, such as a keyboard or a mouse, or even a video camera. Output devices may include a device for providing signals or indications to a user, such as loudspeakers for generating audio signals.

Test system controller 226 may also include a display adapter and further include a display device or, more simply, a display (not shown in FIG. 3). The display adapter may interface shared bus 301, or another bus, with an output port for one or more displays. The display may be implemented as a liquid crystal display screen, a computer monitor, a television or the like. The display may comply with a display standard for computer monitors and/or television displays. Standards for computer monitors include analog standards such as video graphics array (VGA), extended graphics array (XGA), etc., or digital standards such as digital visual interface (DVI) and high-definition multimedia interface (HDMI), among others. A television display may comply with standards such as National Television System Committee (NTSC), phase alternating line (PAL), or another suitable standard. The display may include one or more integrated speakers to play audio content.

In FIG. 3, memory media 310 encompasses persistent and volatile media, fixed and removable media, and magnetic and semiconductor media. Memory media 310 is operable to store instructions, data, or both. Memory media 310 as shown includes sets or sequences of instructions, including virtual rig equipment configuration 312, stimulus/response logic 314, fault injection 316, test result analysis 318, test scenario engine 320, and test alarm handling 322, which are described in further detail below. Memory media 310 may also include an operating system (not shown in FIG. 3), which may be a UNIX or UNIX-like operating system, a Windows® family operating system, or another suitable operating system.

As shown in FIG. 3, virtual rig equipment configuration 312 may represent executable code (i.e., a software module) having functionality for providing virtual equipment and implementing virtual equipment in virtual test scenarios 218 (see FIG. 2). Thus, virtual rig equipment configuration 312 may provide functionality for retrieving model objects, for example, from drilling rig test system knowledge base 306, and introducing them into a state model based on a design for the drilling rig. The design may be an actual design, a reference design, or a virtual design, as will be described in further detail below. Also shown in FIG. 3 is stimulus/response logic 314, which may be used to define internal functionality of particular model objects representing drilling rig equipment and/or external functionality of particular model objects with respect to one another. Examples of internal stimulus/response logic 314 may be a response of an actuator to a control signal provided by test instrumentation 222 or a defined logical action in response to receiving a given sensor input. An example of external functionality is a zone management response, which represents stimulus/response logic 314 for different drilling rig elements for a particular location in the drilling rig (i.e., a zone).

In FIG. 3, fault injection 316 may represent executable code that provides functionality for introducing faults, or error conditions, into the state model. Fault injection 316 may provide valuable insights into otherwise hidden characteristics of the state model (and hence the actual drilling rig) by enabling the visualization of results of a failure of a given drilling rig element. Fault injection 316 may provide the ability to introduce faults that would otherwise be difficult or impossible to generate on the actual (i.e., physical) drilling rig using the drilling rig control system. Accordingly, virtual test scenarios 218 may specify particular faults generated using fault injection 316. Further shown in FIG. 3, test scenario engine 320 may represent an execution environment for test scenarios, including virtual test scenarios 218. In certain embodiments, test scenario engine 320 may receive as input a test scenario, which specifies various conditions and parameters for execution. The test scenario executable by test scenario engine 320 may include a test script of specific actions to take and test results that are to be evaluated. The test scenario executable by test scenario engine 320 may include internal logic for performing actions depending on a result of a particular test or for adhering to a given state model for the drilling rig (see also FIG. 7). The test scenario executable by test scenario engine 320 may be performed by manual execution (i.e., under operator control), by automatic execution (i.e., under processor control), or a combination thereof. In addition to test results that may be generated and logged by test scenario engine 320, alarms and/or other types of notifications may be generated for logging and/or reporting to an operator, either local or remote.

Also in FIG. 3, test result analysis 318 may represent executable code that provides functionality for analyzing test results generated by test scenario engine 320. Test result analysis 318 may analyze logged test results or test results generated in real time. Test result analysis 318 may further generate suggestions for virtual drilling rig elements based on an analysis of test results, in order to improve or increase test coverage. In this manner, test result analysis 318 may support an iterative or recursive process for virtualized drilling rig testing to arrive at an optimal configuration for the drilling rig. Further in FIG. 3 is test alarm handling 322, which may represent executable code for generating, dispatching, and deactivating alarms in the drilling rig test system. It is noted that test result analysis 318 may also generate new alarms for handling by test alarm handling 322, based on the analysis of test results performed. Alarms and messages processed by test alarm handling 322 may be specific to a given piece of drilling rig equipment (either real or virtual) or to a particular subcomponent or subsystem.

Figure 4:
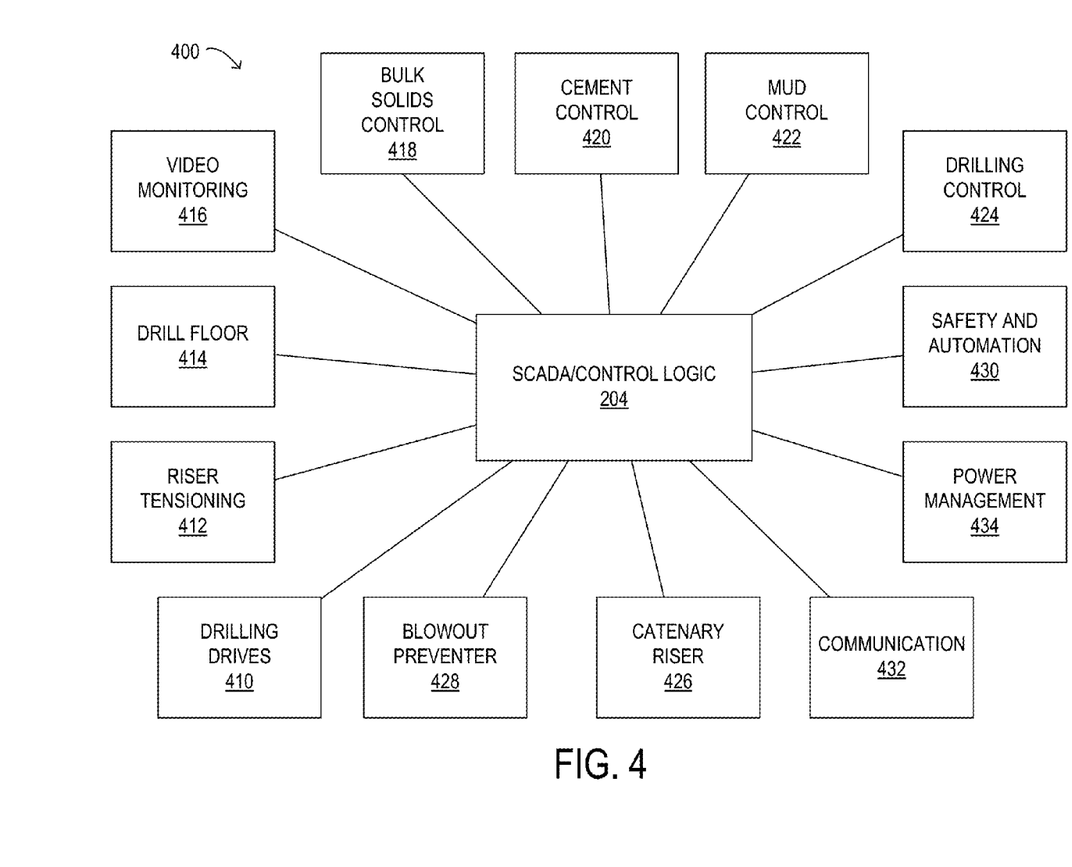
FIG. 4 is a block diagram of selected elements of an embodiment of a drilling rig test system.

Turning now to FIG. 4, a block diagram of selected elements of an embodiment of drilling rig control system 400 is depicted. The elements depicted in drilling rig control system 400 may be representative of particular subsystems of a semi-submersible drilling rig and are shown without internal details for descriptive clarity. It is noted that, in various embodiments, drilling rig control system 400 may be implemented with various elements for different uses, such as a land rig, for example. Shown centrally coupled to other elements, SCADA/control logic 204 represents a main controller for the drilling rig and may generate SCADA control signals 214 to interface with the exemplary elements shown in drilling rig control system 400 (see also FIG. 2). It is noted that SCADA/control logic 204 is associated with HMI 204, which may provide an operator interface for controlling drilling rig control system 400. Elements depicted in drilling rig control system 400 may also represent model objects, or categories of model objects, that are used to implement a state model of a drilling rig (see also FIG. 7).

In FIG. 4, drilling drives 410 may represent equipment for powering the drill bit using either variable speed drives and/or variable frequency drives. Riser tensioning 412 may represent equipment for controlling a tension of the catenary riser in a desired manner. Drill floor 414 may represent various drilling equipment around the drilling derrick, including a riser catwalk, a floor monkey, a pipe handler, draw works, guide arms, a top drive, power slips, a rotary table, trolleys, tongs, a stand building, and finger boards, among others (see also FIG. 6). Video monitoring 416 may represent closed-circuit television monitoring of video cameras on the drilling rig as well as video feeds from subsea cameras. Bulk solids control 418 may represent equipment for adding/removing solids to/from drilling mud and other drilling fluids, such as cement. Cement control 420 may represent equipment for mixing, storing and pumping down hole cement, which may comprise various specialized formulations. Mud control 422 may represent equipment for mixing, storing and pumping drilling mud. Drilling control 424 may represent equipment for controlling and switching drilling machinery. Safety and automation 430 may represent equipment for handling anchors, load and stability, including dynamic positioning systems that may include gyroscopes, positioning sensors, etc. Power management 434 may represent equipment for power generation, power distribution, and emergency/backup power supplies. Communication 432 may represent equipment for telecommunications and computer networking, including wireless communication links that may be terrestrial or extra-terrestrial (e.g., satellite links). Catenary riser 426 may represent equipment associated with the drill string between the drilling rig and the ocean floor. Blowout preventer 428 may represent equipment for securing the wellhead at the ocean floor in case of loss of control of material flowing through the well.

Figure 5:
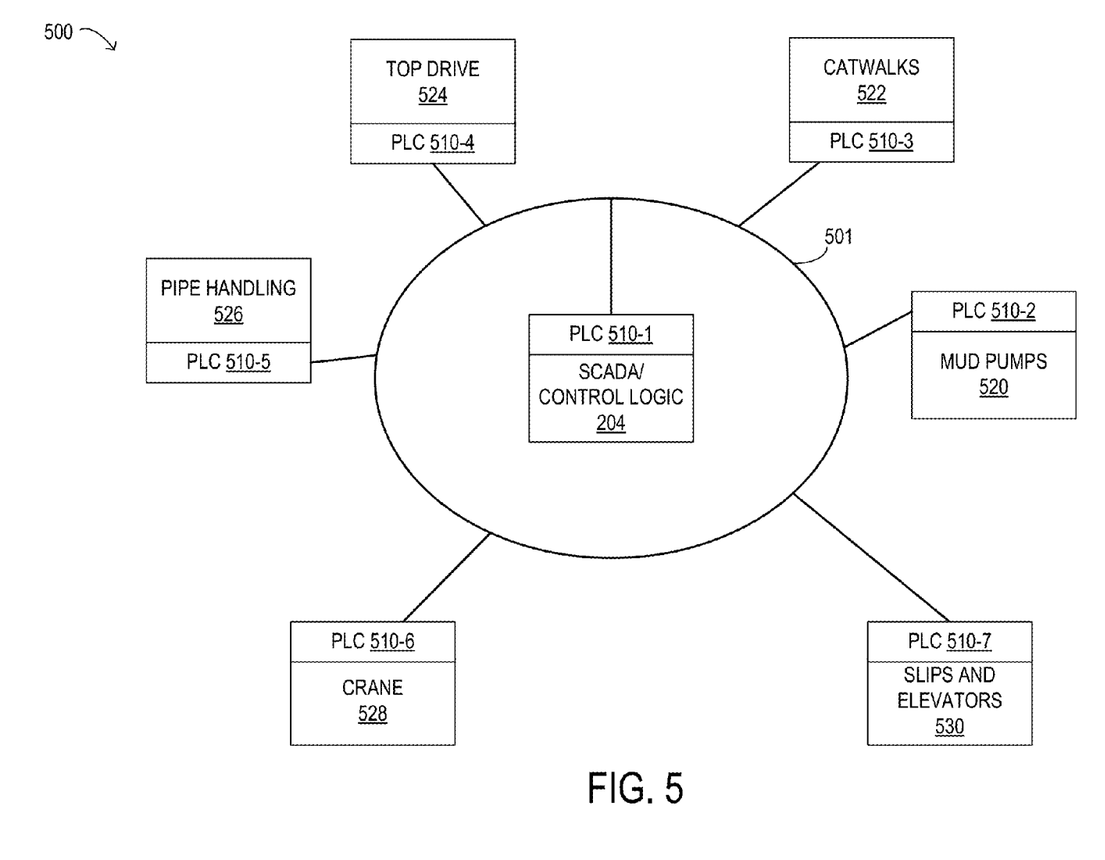
FIG. 5 is a block diagram of selected elements of an embodiment of a drilling rig test system network.

Turning now to FIG. 5, a block diagram of selected elements of an embodiment of drilling rig control system 500 is depicted. The elements depicted in drilling rig control system 500 may be representative of particular subsystems of a land drilling rig and are shown without internal details for descriptive clarity. It is noted that, in various embodiments, drilling rig control system 500 may be implemented with various elements for different uses, such as a semi-submersible rig, for example. Drilling rig control system 500 is shown with control network 501, which interfaces respective PLCs 510 that control individual elements. PLCs 510 may also include sensor and input/output interfaces (not shown in FIG. 5) that provide connectivity to desired interfaces. It is further noted that, in certain embodiments, drilling rig control system 400 (see FIG. 4) may also include control network 501 and PLCs 510 to connect various elements. Control network 501 may be any of a number of different types of networks, including wired, wireless, and optical networks, or various combinations thereof. Shown centrally coupled to other elements, SCADA/control logic 204 represents a main controller for the drilling rig and may generate SCADA control signals 214 using PLC 510-1 and/or network communications via control network 501 to interface with the exemplary elements shown in drilling rig control system 500 (see also FIG. 2). It is noted that SCADA/control logic 204 is associated with HMI 204, which may provide an operator interface for controlling drilling rig control system 500. Elements depicted in drilling rig control system 500 may also represent model objects, or categories of model objects, that are used to implement a state model of a drilling rig (see also FIG. 7).

In FIG. 5, mud pumps 520 may represent equipment for pumping drilling mud into the wellbore and may generate control signals and sensor interfaces using PLC 510-2. Catwalks 522 may represent equipment for positioning ramps and platforms for providing drill string tools to and from the drilling floor and may generate control signals and sensor interfaces using PLC 510-3. Top drive 524 may represent equipment for providing rotation and circulation at the top of the drill string and may generate control signals and sensor interfaces using PLC 510-4. Pipe handling 526 may represent equipment for managing drill pipe supply and may generate control signals and sensor interfaces using PLC 510-5. Crane 528 may represent equipment for controlling overhead lifting machines and gantries and may generate control signals and sensor interfaces using PLC 510-6. Slips and elevators 530 may represent equipment for lifting and lowering drill pipe and may generate control signals and sensor interfaces using PLC 510-7.

Figure 6:
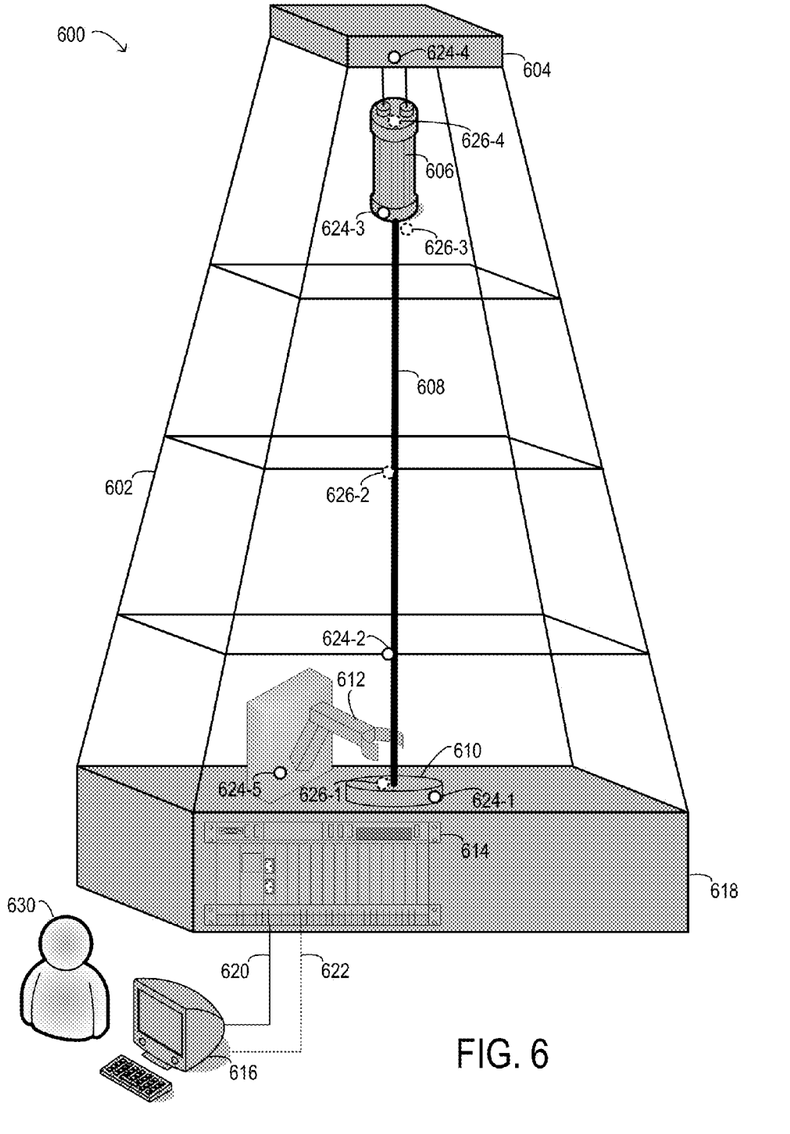
FIG. 6 is a block diagram of selected elements of an embodiment of a drilling rig test system.

Turning now to FIG. 6, a block diagram of selected elements of an embodiment of drilling rig 600 is depicted. As shown, drilling rig 600 may represent a particular design or implementation that includes a given collection of components. The components, or elements, included in a particular implementation of drilling rig 600 may be represented by model objects in a state model, which can be used to simulate operational conditions and implement test scenarios, such as virtual test scenarios 218, as described above with respect to FIG. 2. Thus, a particular implementation of drilling rig 600 may represent a reference design, an actual design, or a new design. A reference design may describe a known configuration or implementation of drilling rig 600, and may not be physically embodied. An actual design may describe an actual physical implementation of drilling rig 600. A new design may describe a modified actual or reference design, for example, using virtual equipment that has been added to the state model using model objects that can represent real or virtual elements. It is therefore noted that drilling rig 600, as shown in FIG. 6, is an exemplary embodiment shown for descriptive purposes.

In drilling rig 600, derrick 602 may represent a hollow pyramidal frustum structure that is comprised of steel beams and members and supports various other drilling equipment. As shown, derrick 602 may be supported by (or built on top of) drilling base 618 while being capped by crown block 604 at a top portion. In different embodiments, drilling base 618 may be anchored into the ground or may be a structural element in a larger piece of equipment, such as a semi-submersible drilling platform. Crown block 604 may support top drive 606, which may be configured to be raised or lowered relative to crown block 604. Top drive 606 may provide rotation and/or circulation to drill string 608 which passes through rotary table 610 before continuing down the wellbore (not shown in FIG. 6). Iron roughneck 612 may represent equipment for clamping and supporting drill string 608 to enable drilling operations, such as adding drill pipe or performing other tasks on drill string 608.

With this relatively simplistic description of elements included in drilling rig 600, the concept of zones and zone management may be demonstrated. A zone may represent a certain area or location where equipment and workers perform tasks. A zone management system may refer to physical and electronic systems that ensure that no collisions or safety breaches occur by equipment in the zone. A zone management system is therefore a precautionary safety system designed to prevent failures and faults from occurring. For example, one zone may be at a surface of drilling base 618 (i.e., the drilling floor), where rotary table 610, drill string 608 and iron roughneck 612 all operate. In one embodiment, a zone management system implemented with drilling rig 600 at the drilling floor may prevent iron roughneck 612 from engaging unless certain conditions are satisfied, for example, only when top drive 606 is not supplying rotary power to drill string 608. Various zones and conditions for zones may be implemented with drilling rig 600 and also with a state model describing a particular implementation of drilling rig 600.

Also shown with drilling rig 600 in FIG. 6 is PLC 614, which may provide sensor interfaces to sensors 624 and provide real signals 620 that are made visible to operator 630 at drilling rig HMI 616. For clarity of description, PLC 614 is shown as a single unit without ancillary interfaces, but it will be understood that PLC 614 may represent a network of PLCs or other controllers (see also FIG. 5) that are integrated within the component elements of drilling rig 600. Actual sensors included in drilling rig 600 include drill floor sensor 624-1, drill string sensor 624-2, top drive sensor 624-3, crown block sensor 624-4, and iron roughneck sensor 624-5. Sensors 624 may represent any of various types of sensors for detecting position, movement, rotation, proximity, etc. and may be analog or digital or a combination thereof.

In operation of drilling rig testing system 220 with drilling rig 600, sensors 624 may provide only limited test coverage, that is, may enable testing of a limited number of operational states and/or zone conditions, while leaving many potential operation states and real-life situations untested. Drilling rig 600 may be used as an actual design for implementation in a state model, using model objects to describe elements included within drilling rig 600, including sensors 624. Then, virtual sensors 626 may be added to the state model using model objects. As shown in FIG. 6, virtual sensors may include rotary table sensor 626-1, drill string sensors 626-2, 626-3, and top drive sensor 626-4. Virtual sensors 626 may provide additional information and enable more operational states to be simulated in the state model. Then, virtual sensors 626 may be implemented in drilling rig HMI 616, whereby PLC 614 may be configured to generate virtual signals 622 that are real signals representing virtual sensors 626. In this manner, a greater number of operational states of drilling rig 600 may be tested.

Figure 7:
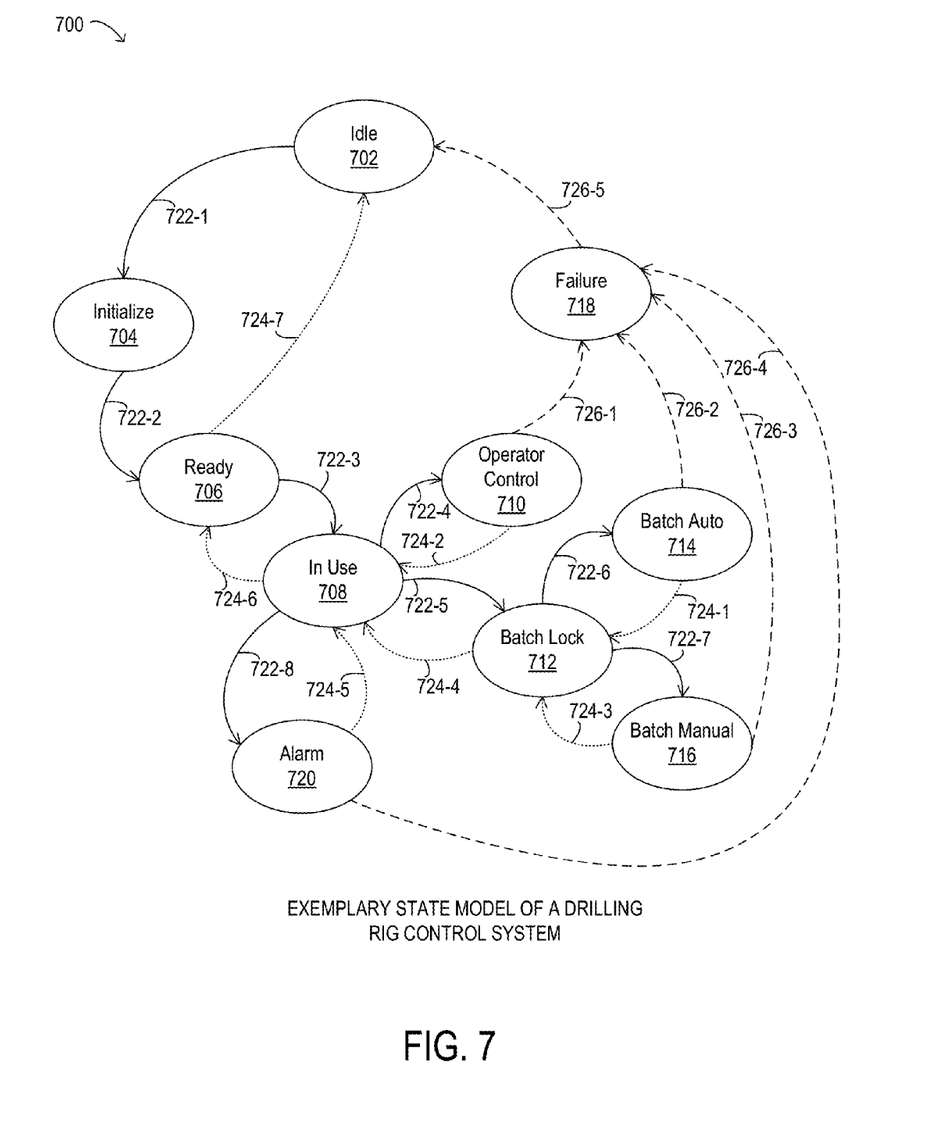
FIG. 7 is a block diagram of selected elements of an embodiment of a state model representing a drilling rig test system.

Turning now to FIG. 7, selected elements of an embodiment of state model 700 representing operational states of drilling rig test system 220 are shown in diagram form. A state model, also known as a finite state machine, a finite-state automaton or simply, a state machine, is a mathematical abstraction that may be used to design digital logic or computer executable algorithms. A state model represents a behavior model comprised of a finite number of states, transitions between those states, and actions, similar to a flow graph, which is used to visualize logic flow when certain conditions are met. A state model may be implemented with finite internal memory, an input feature that reads symbols in a sequence, and an output feature, which may be in the form of a user interface. The operation of a state model begins from one given state (sometimes referred to as a start state), goes through transitions depending on input to different states and may end in any of those available. In certain embodiments, a certain set of states mark a successful flow of operation of the state model.

In FIG. 7, state model 700, as shown, is an exemplary embodiment representing top-level functionality of drilling rig test system 220 for greater descriptive clarity. It is noted that individual elements shown in state model 700 may represent further internal state models (not shown in FIG. 7) that may be hierarchically organized. Also, state model 700 may employ model objects (not shown in FIG. 7) representing real and/or virtual equipment used in a drilling rig. Thus, in various embodiments, state model 700 may include more complexity and features to describe different aspects and details of operating a drilling rig.

In FIG. 7, a start state is represented by idle state 702, from which all other states originate. During idle state 702, it may be assumed that the drilling rig is not operational and may further be powered down, either partially or wholly. As shown in FIG. 7, forward actions 722 represent activation or engagement of operational activities, while reverse actions 724 represent deactivation or cessation of operational activities. Both forward actions 722 and reverse actions 724 represent controlled state transitions during normal and expected operation of the drilling rig. Fault actions 726 are state transitions associated with failure state 718, representing a failure of a certain component or sub-system that results in idle state 702 via fault action 726-5. From idle state 702, forward action 722-1 may be taken to reach initialize state 704, during which elements in the drilling rig may be prepared for operation, for example, as an automated start-up sequence. After initialize state 704 has been successfully completed, ready state 706 is attained via forward action 722-2. When initialize state 704 is not successfully completed, ready state 706 may provide an indication of why initialize state 704 was not completed and then return to idle state 702 via reverse action 724-7.

From ready state 706, when the drilling rig is activated and in control of an operator, in use state 708 is reached by forward action 722-3. When the operator deactivates the drilling rig, in use state 708 may transition back to ready state 706 by reverse action 724-6. The remaining operational states may be concurrently active with in use state 708, even though one particular state may be currently active. When an alarm is detected, forward action 722-8 results in alarm state 720 being activated, while reverse action 724-5 may represent clearing of a previous alarm and return to in use state 708 (or simply deactivation of alarm state 720). When alarm state 720 is reached due to equipment failure, fault action 726-4 may lead from alarm state 720 to failure state 718 and result in deactivation of any other active states. As shown in state model 700, manual and batch operation may be performed from in use state 708, as will now be described in further detail.

In FIG. 7, from in use state 708, forward action 722-4 may activate operator control state 710, which represents manual control of the drilling rig by the operator. In operator control state 710, the operator may be permitted to perform various actions and directly control drilling rig equipment. Operator control state 710 may be terminated by reverse action 724-2 in a controlled manner or by fault action 726-1 when an equipment failure occurs. Also from in use state 708, forward action 722-5 may activate batch lock state 712, which represents batch operation of the drilling rig, in which sequences of operations (i.e., batches) may be initiated in full automatic or semi-automatic manner. The operations specified in the batch may correspond to manual operations performed by the operator in operator control state 710. In batch lock state 712, the drilling rig may be prepared for automatic operations, while manual controls may be deactivated. Batch lock state 712 may remain active during batch operations. From batch lock state 712, forward action 722-6 may activate batch auto state 714, during which an automated batch operation may be executed and then return to batch lock state 712 via return action 724-1. Also from batch lock state 712, forward action 722-7 may activate batch manual 716, during which the operator may initiate one or more batch operations before returning to batch lock 712 via return action 724-3. Batch lock state 712 may be released (i.e., deactivated) by return action 724-4 back to in use state 708. When an equipment failure occurs during batch auto state 714, fault action 726-2 may lead to failure state 718, while fault action 726-3 may result when an equipment failure occurs during batch manual state 716.

As mentioned previously, state model 700 is an exemplary embodiment that can be used for virtualization of operational states of a particular design of a drilling rig. An important use of state model 700 is when different particular embodiments are implemented in parallel and then compared against one another to reveal differences. For example, two actual drilling rigs may be compared against one another using their respective state models. The comparison may include analysis of failure states and alarm conditions. An actual drilling rig may be compared to a reference drilling rig that is known to have certain properties and features, such as a high level of operational safety, using their respective state models. A state model of an actual drilling rig may be modified, for example, by adding virtual components not physically present in the actual drilling rig. The modified state model can then be compared to the original state model. Based on these different state models and analyses of the comparisons between state models, specific, targeted modifications to the actual drilling rig may be made that are know to improve operation, for example, by eliminating or preventing failure states that would otherwise be attainable. For operational testing, virtual elements selected by comparison of different state models may be implemented in an actual drilling rig test system, for example, as a piece of virtual equipment (see also FIG. 3) in a test system controller, and then used for testing operational states. It is noted that the processes using state models described above may be repeated in an iterative and/or heuristic manner to arrive or converge at desired results.

Figure 8:
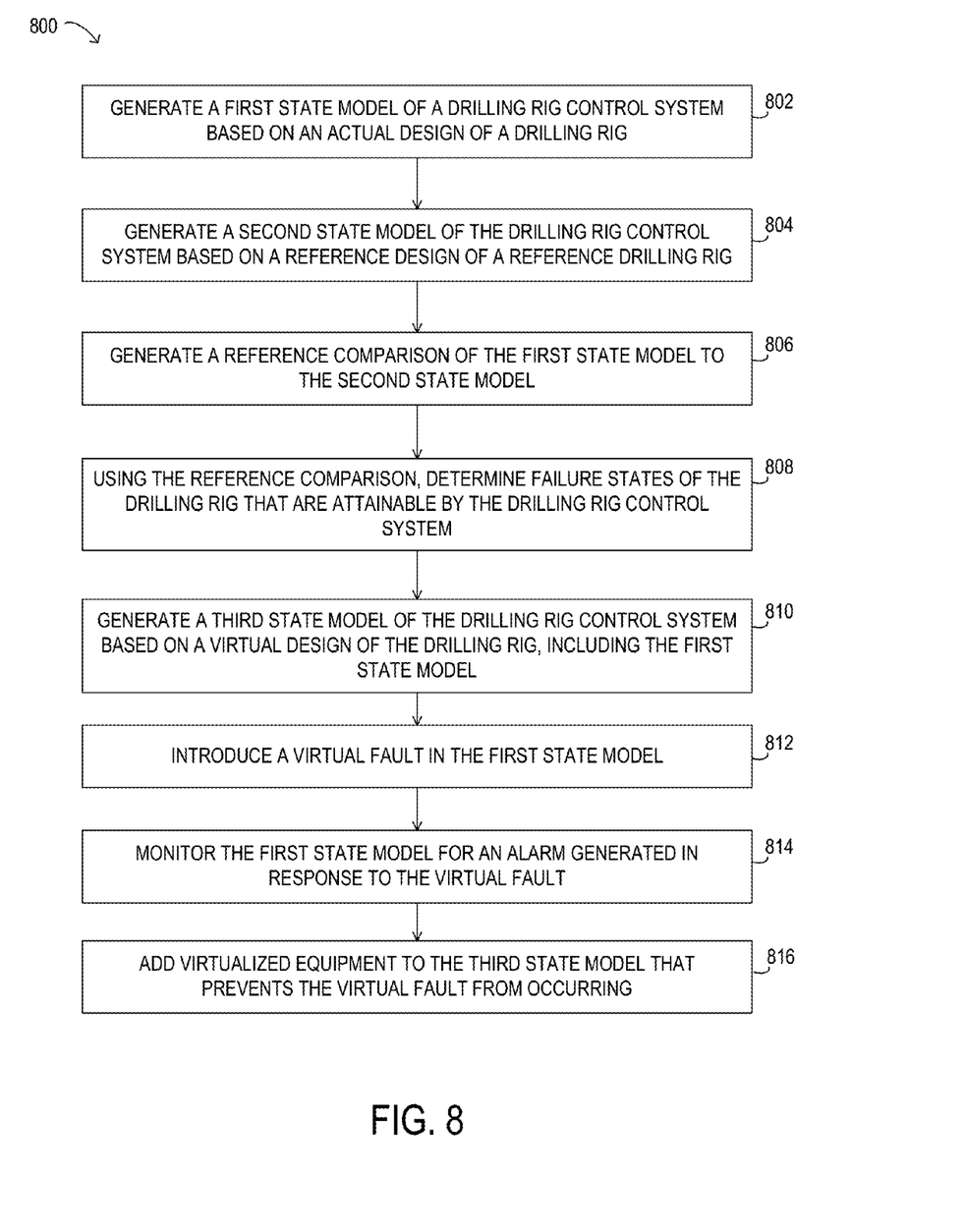
FIG. 8 is a flow diagram of selected elements of an embodiment of a method for optimizing a drilling rig test system.

Turning now to FIG. 8, an embodiment of novel method 800 for performing operational testing of a drilling rig, as described herein, is illustrated in flow chart form. In one embodiment, method 800 is performed by test system controller 226 (see FIG. 2). It is noted that certain operations described in method 800 may be optional or may be rearranged in different embodiments.

Method 800 may begin by generating (operation 802) a first state model of a drilling rig control system based on an actual design of a drilling rig. The actual design may, for example, describe an implementation of a physically constructed drilling rig. Then, a second state model of the drilling rig control system may be generated (operation 804) based on a reference design of a reference drilling rig. The reference drilling rig may be another physically constructed drilling rig or a reference model of a drilling rig. A reference comparison of the first state model to the second state model may be generated (operation 806). Using the reference comparison, failure states may be determined (operation 808) that are attainable by the drilling rig control system. Then, a third state model of the drilling rig control system may be generated (operation 810) that is based on a virtual design of the drilling rig, including the first state model. The virtual design may include virtual equipment and respective model objects. A virtual fault may be introduced (operation 812) in the first state model. The virtual fault may be an alarm condition and/or a failure state of a model object. Then, the first state model may be monitored (operation 814) for an alarm generated in response to the virtual fault. Finally, virtualized equipment may be added (operation 816) to the third state model that prevents the virtual fault from occurring. Based on the modified third state model in operation 816, virtual and/or real equipment may be added to the drilling rig control system.

Figure 9:
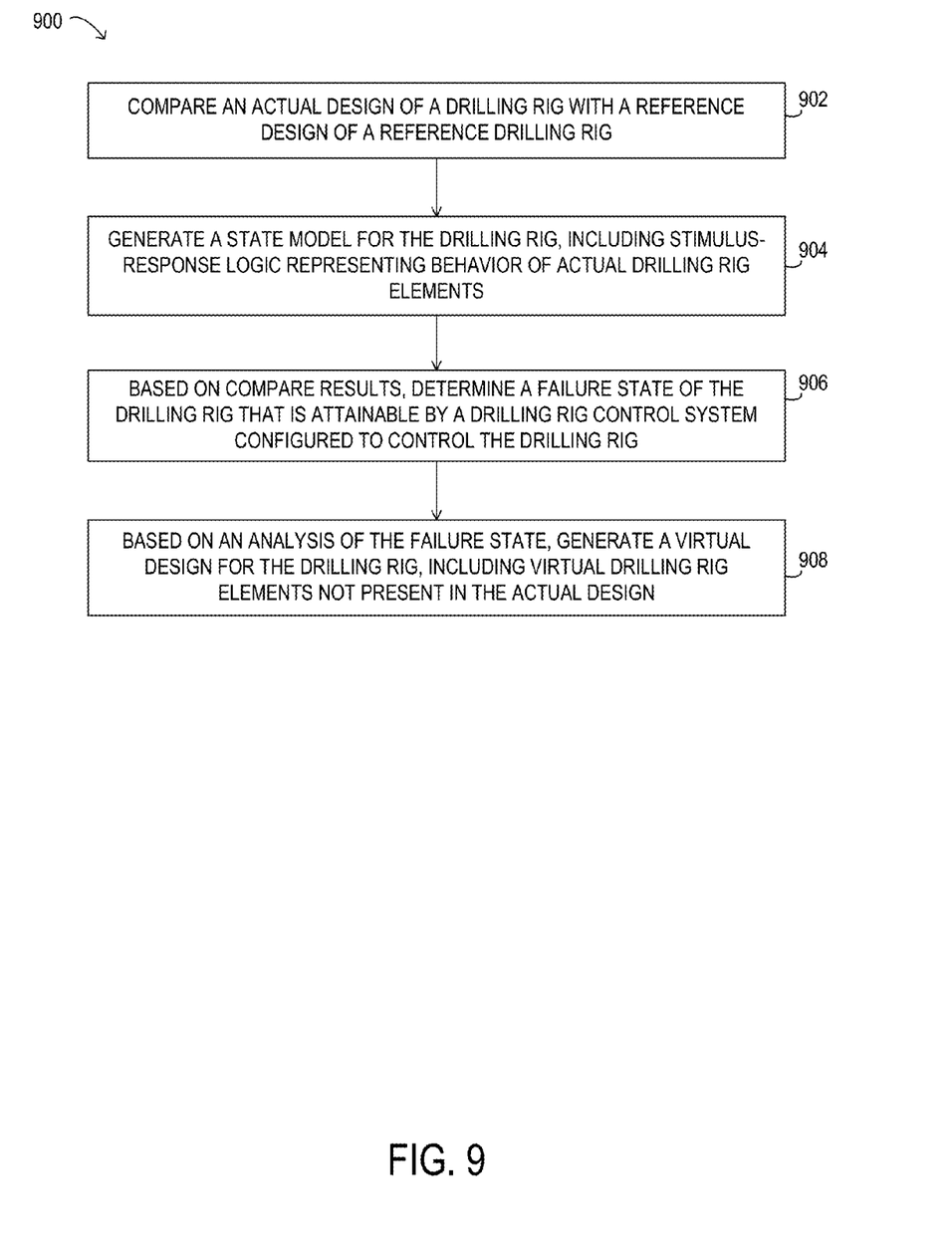
FIG. 9 is a flow diagram of selected elements of an embodiment of a method for optimizing a drilling rig test system.

Turning now to FIG. 9, an embodiment of novel method 900 for performing operational testing of a drilling rig, as described herein, is illustrated in flow chart form. In one embodiment, method 900 is performed by test system controller 226 (see FIG. 2). It is noted that certain operations described in method 900 may be optional or may be rearranged in different embodiments.

Method 900 may begin by comparing (operation 902) an actual design of a drilling rig with a reference design of a reference drilling rig. A state model for the drilling rig may be generated (operation 904) that includes stimulus-response logic representing behavior of actual drilling rig elements. Based on compare results, a failure state of the drilling rig may be determined (operation 906) that is attainable by a drilling rig control system configured to control the drilling rig. Based on an analysis of the failure state, a virtual design for the drilling rig may be generated (operation 908) that includes virtual drilling rig elements not present in the actual design. The virtual design may eliminate the failure state.

To the maximum extent allowed by law, the scope of the present disclosure is to be determined by the broadest permissible interpretation of the above noted claims and the following claims and their equivalents, and shall not be restricted or limited to the specific embodiments described in the foregoing detailed description.

What is claimed is:

1. A method for analyzing a drilling rig, comprising:
   generating a first finite state machine of a drilling rig control system based on an actual design of the drilling rig, wherein the first finite state machine includes model objects representing drilling rig elements;
   generating a reference comparison of the first finite state machine to a second finite state machine of the drilling rig control system based on a reference design of a reference drilling rig, wherein the second finite state machine includes the model objects;
   determining by a computer, from the first finite state machine, failure states of the drilling rig that are attainable by the drilling rig control system; and
   using the reference comparison for determining the failure states, wherein the failure states are indicative of items selected from a group consisting of new alarms and equipment failure states in the drilling rig control system.

2. The method of claim 1, wherein the model objects are obtained from an object library of drilling rig elements.

3. The method of claim 1, wherein a model object includes stimulus-response logic for interacting with other model objects in the first finite state machine.

4. The method of claim 1, further comprising:
   generating a third finite state machine of the drilling rig control system based on a virtual design of the drilling rig, wherein the virtual design includes virtualized equipment for the drilling rig, and wherein the third finite state machine includes the model objects, including model objects representing the virtualized equipment.

5. The method of claim 4, wherein the third finite state machine includes the first finite state machine.

6. The method of claim 4, wherein the virtualized equipment is configured to prevent a failure state of the drilling rig in the third finite state machine.

7. The method of claim 4, further comprising:
   introducing a virtual fault in the first finite state machine; and
   monitoring the first finite state machine for an alarm generated in response to the virtual fault.

8. The method of claim 7, further comprising:
   based on the alarm, adding a first virtualized equipment to the virtual design, wherein the first virtualized equipment prevents the virtual fault from occurring in the third finite state machine.

9. The method of claim 8, wherein a model object representing the first virtualized equipment is selected from a list consisting of model objects representing: a sensor, an actuator, a control element, a signal processing element, and an interface element.

10. The method of claim 8, further comprising:
    based on an analysis of the third finite state machine, determining that an actual instance of the first virtualized equipment prevents a failure state in the actual design of the drilling rig.

11. The method of claim 8, further comprising:
    adding the first virtualized equipment to the drilling rig control system, wherein a model object representing the first virtualized equipment is used to generate output signals that are monitored by physical inputs to the drilling rig control system.

12. Non-transitory computer readable media for analyzing a drilling rig, including processor executable instructions that, when executed by a processor, cause the processor to perform operations comprising:
    generating a finite state machine for the drilling rig, including stimulus-response logic representing behavior of drilling rig elements;
    generating a reference comparison of an actual design of the drilling rig with a reference design of a reference drilling rig; and
    using the reference comparison, determining a failure state of the drilling rig that is attainable by a drilling rig control system configured to control the drilling rig, wherein the failure state is indicative of an item selected from a group consisting of a new alarm and an equipment failure state in the drilling rig control system.

13. The non-transitory computer readable media of claim 12, wherein the reference design is based on an object library of virtual drilling rig elements representing actual drilling rig elements.

14. The non-transitory computer readable media of claim 12, wherein the finite state machine represents actual drilling rig elements and virtual drilling rig elements.

15. The non-transitory computer readable media of claim 12, wherein the drilling rig includes a zone management system configured to prevent physical collisions of drilling rig elements.

16. The non-transitory computer readable media of claim 15, wherein the failure state includes collisions that are attainable by the zone management system.

17. The non-transitory computer readable media of claim 12, wherein the operations include operations for:
- based on an analysis of the failure state, generating a virtual design for the drilling rig, wherein the virtual design includes virtual drilling rig elements not present in the actual design.

18. The non-transitory computer readable media of claim 17, wherein the virtual design is configured to eliminate the failure state.

19. A computer system for analyzing a drilling rig, comprising:
- a processor; and
- memory media accessible to the processor, the memory media including processor executable instructions that, when executed by the processor, cause the processor to perform operations comprising:
- generating a reference comparison of an actual design of the drilling rig with a reference design of a reference drilling rig, wherein the reference design is based on an object library of virtual drilling rig elements representing actual drilling rig elements;
- using the reference comparison, determining a failure state of the drilling rig that is attainable by a drilling rig control system configured to control the drilling rig and wherein the failure state is indicative of an item selected from a group consisting of a new alarm and an equipment failure state in the drilling rig control system;
- generating a finite state machine for the drilling rig, the finite state machine including stimulus-response logic representing behavior of drilling rig elements; and
- based on an analysis of the failure state, generating a virtual design for the drilling rig, wherein the virtual design includes virtual drilling rig elements not present in the actual design, wherein the virtual design is configured to eliminate the failure state.

* * * * *